(12) United States Patent
Sun

(10) Patent No.: US 8,350,404 B2
(45) Date of Patent: Jan. 8, 2013

(54) REGULATING DEVICE OF GENERAL AUTOMOBILE PERFORMANCE

(76) Inventor: Jianpeng Sun, Dongguan (CN)

( * ) Notice: Subject to any disclaimer, the term of this patent is extended or adjusted under 35 U.S.C. 154(b) by 197 days.

(21) Appl. No.: 12/815,435

(22) Filed: Jun. 15, 2010

(65) Prior Publication Data

US 2011/0304201 A1 Dec. 15, 2011

(30) Foreign Application Priority Data

Jul. 8, 2009 (CN) ....................... 2009 2 0087105 U

(51) Int. Cl.
*B60L 1/00* (2006.01)
*B60L 3/00* (2006.01)
*H02G 3/00* (2006.01)

(52) U.S. Cl. ...................................... 307/10.1

(58) Field of Classification Search ............... 307/9.1, 307/10.1
See application file for complete search history.

(56) References Cited

U.S. PATENT DOCUMENTS

| 2006/0243261 A1* | 11/2006 | Sun ............................ 123/565 |
| 2007/0245715 A1* | 10/2007 | Shiu ............................. 60/277 |
| 2010/0019570 A1* | 1/2010 | Kade et al. .................. 307/10.1 |
| 2010/0264726 A1* | 10/2010 | Dechwanapong ............ 307/9.1 |

* cited by examiner

*Primary Examiner* — Jared Fureman

(57) ABSTRACT

A regulating device for general automobile utilizes automobile batteries, the plug of the lighter, or the DC output of the engine to obtain power. It has a voltage recognition circuit; when voltage is ≧12.9V, the circuit is started up; when the voltage is ≦12.8V, the circuit is cut off; as a result, the storage batteries can be protected effectively. When the automobile is started, the circuit will generate pulse energy of 5KHz-10KHz; the pulse has the function of clamping voltage reversely and therefore will eliminate the electromagnetic induction ripple derived from the lightering and fuel feeding circuit, shorten the primary and secondary induction time of lighter coils, quicken the on/off action of a fuel injection needle valve, and improve sprayability effects, make combustion more fully and cut down the carbon deposits; torque can be increased, emission can be cut; accordingly, the whole automobile performance will be improved greatly.

20 Claims, 1 Drawing Sheet

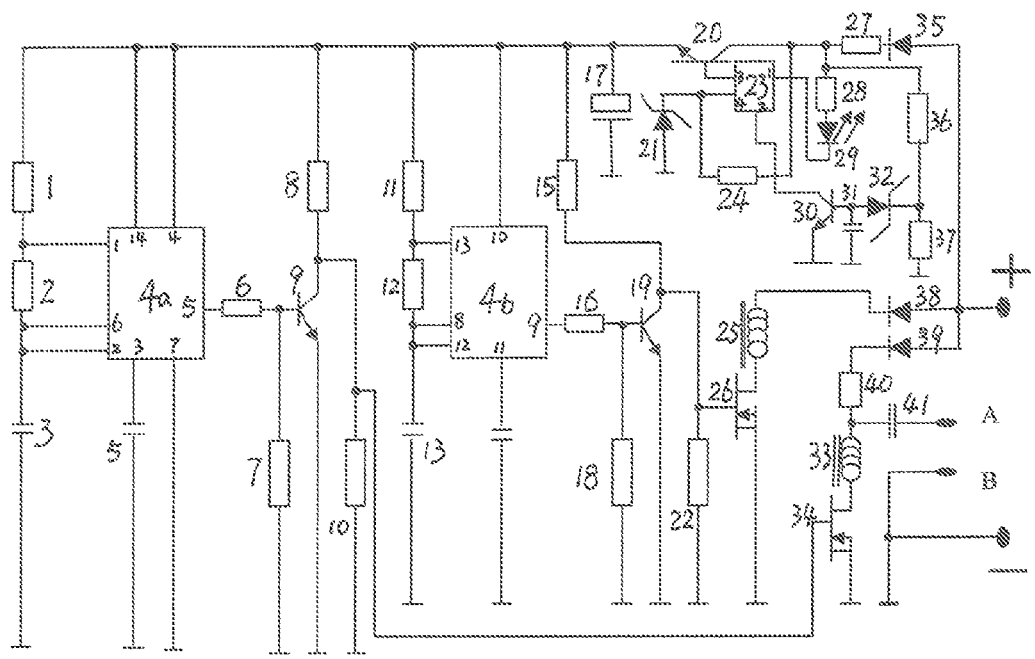

REGULATING DEVICE OF GENERAL AUTOMOBILE PERFORMANCE

BACKGROUND

1. Field of the Invention

The present invention is related to the automobile field, particularly, to a regulating device of general automobile performance, such as, to improving the power, reducing the gas consumption and controlling emission of an automobile.

2. Brief Description of Related Arts

Nowadays, the designing and manufacturing of automobiles have already become industrial products with reliable technology and fully-established markets. The progress of fuel feeding technology, having evolved from carburetors to electronic controlling units, takes a very important role in increasing the power and improving the fuel economy of automobiles. However, due to different electronics installed in an vehicle, the electromagnetic interference among them is getting worse and worse; as a result, the corresponding sensing, sampling and analysis of an auto computer are affected drastically. In the current technology, if the power of automobiles is deliberately increased, the gas consumption will inevitably go up. On the contrary, if fuel economy is the purpose, the power will go down. In addition, excessive emission will be resulted from the reasons mentioned above, and therefore will get rise to environmental pollution.

SUMMARY OF THE PRESENT INVENTION

The object of the present invention is to furnish a regulating device of general automobile performance, which does not need to change the original design of an vehicle, but still can enhance the combustion efficiency of the engine of, increase the torque of , save the gas consumption of and lessen the emission of the vehicle.

According to the present invention, the regulating device of general automobile performance comprises an electrical source with its anode and cathode connected with the anode and cathode of automobile electronics respectively, at least two similar regulating circuits connected in parallel with each other and with their output signals outputted to the automobile electronics to regulate their performance, and a voltage recognition circuit for supplying power to and controlling on /off state of the at least two similar regulating circuits.

Each one of said two similar regulating circuits comprises a signal generating circuit, a dephasing circuit and an energy stroraging circuit.

Said signal generating circuit can be a 556 IC. with a peripheral RC (resistor-capacitor) time circuit; the 556 IC. generates a square signal and the peripheral RC time circuit controls the frequency and time of the square signal. Said dephasing circuit comprises a triode with its peripheral resistors for dephasing the square signal. Said energy storaging circuit comprises a field effect transistor, an inductor and a diode, connected successively. The signal after being dephased goes to the field effect transistor in order to be enlarged; then it is storaged through the inductor, and finally added to the anode of any one automobile electronics by applying the reverse breakdown characteristic of the diode.

Said voltage recognition circuit is connected with any of the automobile electronics. The voltage recognition circuit comprises voltage division resistors for dividing the voltage from the automobile electronics, optical coupling components for supplying the electrically-isolated and stable power to the at least two regulating circuits, a triode for conducting or blocking the optical coupling components, and a voltage regulator tube for, when reverse breakdown takes place, obtaining a stable voltage being added to the triode.

When supplied with power through plugs of automobile batteries or a lighter, the voltage recognition circuit can recognize the working state of the automobile. When voltage≧12.9V, the voltage recognition circuit will be started up, while voltage ≦12.8V, it will be turned off. By doing so, the automobile batteries can be economized. When the automobile is not started, the voltage recognition circuit is accordingly in off state; therefore, no power is supplied; so the present device is not going to work, and then the energy of the automobile batteries are not going to be consumed which will ensure sufficient power for the automobile to be started normally. When the automobile is started up, currents resulting from the engine will be added to the anode and cathode of the batteries; at the moment, the voltage range of the batteries is between 13.7V and 13.9V, which means that the present device can work normally; the circuit of the present device will generate pulse energy with 5 KHz-10 KHz; the pulse has such an effective function of clamping voltage reversely as to be able to eliminate the electromagnetic induction ripple derived from the lightering circuit and the fuel feeding circuit, and in turn to shorten the primary and secondary induction time of lighter coils, to quicken the on/off action of the fuel injection needle valve, to improve sprayability effects, to make combustion more fully, and to cut down the carbon deposits; in addition, torque can be increased, and emission can be cut; as a whole, the entire automobile performance will be improved greatly.

Various implementations may include one or more of the following advantages:

improved combustion efficiency, torque and motive force n.KPH; decreased emission and more effective gas saving;

faster startup speed; better speedup performance;

stabilized engine revolution and lower engine noises;

stabilized electronics performance; strengthened capability of anti-interference; longer service life.

These and other objectives, features, and advantages of the present invention will become apparent from the following detailed description, the accompanying drawings, and the appended claims.

BRIEF DESCRIPTION OF DRAWINGS

FIG. 1 is an electric schematic diagram of the present invention.

DETAILED DESCRIPTION OF PREFERRED EMBODIMENTS

Referring to FIG.1, the regulating device of general automobile performance comprises a resistor 1, a resistor 2, a capacitor 3, a "IC NE556" 4a, a "IC NE556" 4b, a capacitor 5, a resistor 6, a resistor 7, a resistor 8, a triode 9, a resistor 10, a resistor 11, a resistor 12, a capacitor 13, a capacitor 14, a resistor 15, a resistor 16, a capacitor 17, a resistor 18, a triode 19, 1 a triode 20, a voltage regulator tube 21, a resistor 22, a photocoupler 23, a resistor 24, a inductor 25, a field effect transistor 26, a resistor 27, a resistor 28, a LED (Light Emitting Diode) 29, a triode 30, a capacitor 31, a voltage regulator tube 32, an inductor 33, a field effect transistor 34, a diode 35, a resistor 36, a resistor 37, a diode 38, a diode 39, a resistor 40 and a capacitor 41.

The pin 1 of the "IC NE556" 4a, is connected with one terminal of the resistor 1 and one terminal of the resistor 2; the other terminal of the resistor 2 is connected with the pin 6 and the pin 2 of the "IC NE556" 4a, as well as with one terminal of the capacitor 3; the other terminal of the capacitor 3 is grounded; the other terminal of the resistor 1 is connected with the pin 14 and pin 4 of the IC 4a, with one terminal of the resistor 8, with one terminal of the resistor 11, with the pin 10 of the "IC NE556" 4b, with one terminal of the resistor 15, with the anode of the capacitor 17 and with the emitter of the triode 20; the pin 3 of IC 4a is connected with one terminal of the capacitor 5; the other terminal of the capacitor is grounded; the pin 7 of IC 4a is grounded; the pin 5 of 4a is connected with one terminal of the resistor 6; the other terminal of the resistor 6 is connected with one terminal of the resistor 7, the base of the triode 9; the other terminal of the resistor 7 is grounded; the other terminal of the resistor 8 is connected with the collector of the triode 9, one terminal of the resistor 10 and the gate of the FET 34; the emitter of the triode 9 is grounded; the other terminal of the resistor 10 is grounded;

The other terminal of the resistor 11 is connected with the pin 13 of the "IC NE556" 4b and one terminal of the resistor 12; the other terminal of the resistor 12 is connected with the pin 8 and pin 12 of the "IC NE556" 4b, and with one terminal of the capacitor 13; the other terminal of the capacitor 13 is grounded; the pin 11 of 4b is connected with one terminal of the capacitor 14; the other terminal of the capacitor 14 is grounded; the pin 9 of the IC 4b is connected with one terminal of the resistor 16; the other terminal of the resistor 16 is connected with one terminal of the resistor 18 and the base of the triode 19; the other terminal of the resistor 18 is grounded; the other terminal of the resistor 15 is connected with the collector of the triode 19, one terminal of the resistor 22 and the gate of the FET 26; the emitter of the triode 19 is grounded; the other terminal of the resistor 22 is grounded; the cathode of the capacitor 17 is grounded; the pin 3 of the photocoupler 23 is connected with the base of the triode 20; the pin 4 of the photocoupler 23 is connected with the cathode of the voltage regulator tube 21 and one terminal of the resistor 24; the anode of the voltage regulator tube 21 is grounded;

The other terminal of the resistor 24 is connected with the collector of the triode 20, one terminal of the resistor 27, one terminal of the resistor 28 and one terminal of the resistor 36; the pin 1 of the photocoupler 23 is connected with the cathode of the LED 29; the pin 2 of the photocoupler 23 is connected with the collector of the triode 30; the emitter of the triode 30 is grounded; the other terminal of the resistor 28 is connected with the anode of the LED 29; the base of the triode 30 is connected with one terminal of the capacitor 31 and the anode of the voltage regulator tube 32; the other terminal of the capacitor 31 is grounded; the other terminal of the resistor 27 is connected with the cathode of the diode 35; the anode of the diode 35 is connected with the anode of diode 38, the anode of diode 39 and the anode of the electrical source; the drain of FET 26 is connected with one terminal of the inductor 25; the other terminal of the inductor 25 is connected with the cathode of the diode 38; the source of the FET 26 is grounded; the drain of FET 34 is connected with one terminal of the inductor 33; the other terminal of the inductor 33 is connected with one terminal of the resistor 40 and one terminal of the capacitor 41; the other terminal of the resistor 40 is connected with the cathode of the diode 39; the other terminal of the capacitor 41 is connected with a signal output line A; the output line A is connected with the body of the vehicle. Said electrical source has its anode and cathode connected respectively with the anode and cathode of the output of the DC power supply of the automobile engine, wherein the housing of the engine or the engine itself is grounded. The anode and cathode of said electrical source can also connected with the anode and cathode of automobile storage batteries respectively, or connected with the anode and cathode of the automobile lighter respectively.

The working principle is as follows: resistor 1, resistor 2 and capacitor 3 constitute a RC time circuit; by connecting the time circuit with "IC NE556" 4a, a square signal is generated and outputed from the pin 5 of IC 4a; the resistor 7 works for limiting the amplitude of the signal; the triode 9 works for dephasing and enlarging the pulse signal; then the pulse signal is enlarged by the field effect transistor 34, storaged through the inductor 33, and added to the anode of the automobile batteries by way of the diode 39 that has the characteristic of reverse breakdown. Likewise, in the other regulating circuit, resistor 11, resistor 12 and capacitor 13 constitute the other same RC time circuit; by connecting the RC time circuit with "IC NE556" 4b, the square signal can also be generated and outputed from pin 9 of IC 4b; the resistor 16 works for limiting the amplitude of the signals; the triode 19 works for dephasing and enlarging the pulse signals; then the signals are enlarged by the field effect transistor 26, storaged through the inductor 25, and then added to the anode of the automobile batteries by way of the diode 38 that has the characteristic of reverse breakdown.

In addition, the two paths of pulse signals described above can also be added to the coils of the lighter and the fuel injector of the automobile at the same time when added to the batteries. As a result, the characteristics of lightering and fuel injecting will be improved, the sprayability of automobiles will be optimized, the full combustion will be achieved, carbon deposits will be decreased drastically, and torque and Motive Force N.KPH will be enhanced; to sum up, the general performance of the automobile will be improved greatly.

Refering to FIG. 1, the voltage recognition circuit is implemented by following components: after being divided by resistor 36 and resistor 37, the voltage of the automobile batteries is added to the cathode of voltage regulator tube 32; when the automobile is started, the voltage of its engine is over 12.9V, then voltage regulator tube 32 will be broken down, so that triode 30 is turned on, and then resistor 28, LED 29, the pin 1 and 2 of photocoupler 23, as well as the collector and the emitter of the triode 30 all form a conducting passage; therefore, the pin 3 and the pin 4 of photocoupler 23 are also turned on; hence, the electrical potential is added on the base of triode 20 through resistor 24, the pin 3 and the pin 4 of photocoupler 23; and then, the triode 20 is turned on; after being filtered through capacitor 17, the final electrical potential will supply power to the whole circuit.

When the engine is turned off, the voltage of batteries is below 12.8V; after being divided by resistor 36 and resistor 37, since the voltage of the automobile batteries is not able to break down voltage regulator tube 32, the tube is not able to be turned on; therefore, the pin 3 and pin 4 of photocoupler 23 are in a cut-off state too, which, in turn, gets rise to the cut-off of the triode 20; so, the collector of triode 20 does not have power to output; the present device is in a off status.

The present device has utilized the characteristics of reverse protection of the diode, such as diode 35; therefore, if the polarities of the batteries are connected reversely, the whole circuit will not work, thus the power system of the automobile will be protected correspondingly. One skilled in the art will understand that the embodiments of the present invention as shown in the drawings and described above is exemplary only and not intended to be limiting.

It will thus be seen that the objects of the present invention have been fully and effectively accomplished. Its embodiments have been shown and described for the purpose of illustrating the functional and structural principles of the present invention and is subject to change without departure from such principles. Therefore, this invention includes all modifications encompassed within the spirit and scope of the following claims.

What is claimed is:

1. A regulating device of general automobile performance connected with automobile electronics, comprising:
    an electrical source with its anode and cathode respectively connected with an anode and a cathode of the automobile electronics;
    at least two regulating circuits connected with each other in parallel, wherein output signals of the two regulating circuits are outputted to the automobile electronics; and
    a voltage recognition circuit for supplying power to and controlling on/off state of two paths of the two regulating circuits,
    wherein each of the two regulating circuits comprises a signal generating circuit, a dephasing circuit and an energy storing circuit; the signal generating circuit is a 556 IC with a peripheral RC time circuit; the dephasing circuit is a triode with peripheral resistors for limiting an amplitude of and dephasing a square signal; the energy storing circuit comprises a field effect transistor, an inductor and a diode which are connected with each other.

2. The regulating device of general automobile performance, as recited in claim 1, wherein one of the two regulating circuits comprises:
    a resistor (1), a resistor (2), a capacitor (3), an IC (4a), a capacitor (5), five of them constituting a first signal generating circuit;
    a resistor (6), a resistor (7), a resistor (8), a triode (9), a resistor (10), five of them constituting a first dephasing circuit; and
    an inductor (33), a field effect transistor (34), a diode (39), three of them constituting a first energy storing circuit,
    wherein a pin (1) of the IC (4a) is connected with one terminal of the resistor (1) and one terminal of the resistor (2); the other terminal of the resistor (2) is connected with a pin (6) and a pin (2) of the IC (4a), as well as with one terminal of the capacitor (3); the other terminal of the capacitor (3) is grounded; the other terminal of the resistor (1) is connected with a pin (14) and a pin (4) of the IC (4a), with one terminal of the resistor (8) and with the other regulating circuit of the two regulating circuits; a pin (3) of the IC (4a) is connected with one terminal of the capacitor (5); the other terminal of the capacitor (5) is grounded; a pin (7) of the IC (4a) is grounded; a pin (5) of the IC (4a) is connected with one terminal of the resistor (6); the other terminal of the resistor (6) is connected with one terminal of the resistor (7) and a base of the triode (9); the other terminal of the resistor (7) is grounded; the other terminal of the resistor (8) is connected with a collector of the triode (9), one terminal of the resistor (10) and the first energy storing circuit; an emitter of the triode (9) is grounded; the other terminal of the resistor (10) is grounded.

3. The regulating device of general automobile performance, as recited in claim 2, wherein the other one of the two regulating circuits comprises:
    an IC (4b), a resistor (11), a resistor (12), a capacitor (13), a capacitor (14), five of them constituting a second signal generating circuit;
    a resistor (15), a resistor (16), a resistor (18), a triode (19), a resistor (22), five of them constituting a second dephasing circuit; and
    a resistor (25), a field effect transistor (26), a diode (38), three of them constituting a second energy storing circuit,
    wherein one terminal of the resistor (11) is connected with a pin (10) of the IC (4b), one terminal of the resistor (15) and the voltage recognition circuit; the other terminal of the resistor (11) is connected with a pin (13) of the IC (4b) and one terminal of the resistor (12); the other terminal of the resistor (12) is connected with a pin (8) and a pin (12) of the IC (4b), and with one terminal of the capacitor (13); the other terminal of the capacitor (13) is grounded; a pin (11) of the IC (4b) is connected with one terminal of the capacitor (14); the other terminal of the capacitor (14) is grounded; a pin (9) of the IC (4b) is connected with one terminal of the resistor (16); the other terminal of the resistor (16) is connected with one terminal of the resistor (18) and a base of the triode (19); the other terminal of the resistor (18) is grounded; the other terminal of the resistor (15) is connected with a collector of the triode (19), one terminal of the resistor (22) and the second energy storing circuit; an emitter of the triode (19) is grounded; the other terminal of the resistor (22) is grounded.

4. The regulating device of general automobile performance, as recited in claim 3, wherein the voltage recognition circuit comprises a capacitor (17); a triode (20); a voltage regulator tube (21); a photocoupler (23); a resistor (24); a resistor (27); a resistor (28); an LED (light emitting diode) (29); a triode (30); a capacitor (31); a voltage regulator tube (32); a diode (35); a resistor (36); and a resistor (37),
    wherein an anode of the capacitor (17) is connected with the two regulating circuits and an emitter of the triode (20); a cathode of the capacitor (17) is grounded; a pin (3) of photocoupler (23) is connected with a base of the triode (20); a pin (4) of photocoupler (23) is connected with a cathode of the voltage regulator tube (21) and one terminal of the resistor (24); an anode of the voltage regulator tube (21) is grounded; the other terminal of the resistor (24) is connected with a collector of the triode (20), one terminal of the resistor (27), one terminal of the resistor (28) and one terminal of the resistor (36); a pin (1) of the photocoupler (23) is connected with a cathode of the LED (29); a pin (2) of photocoupler (23) is connected with a collector of the triode (30); an emitter of the triode (30) is grounded; the other terminal of the resistor (28) is connected with an anode of the LED (29); a base of the triode (30) is connected with one terminal of the capacitor (31) and an anode of the voltage regulator tube (32); the other terminal of the capacitor (31) is grounded; the other terminal of the resistor (27) is connected with a cathode of the diode (35); an anode of the diode (35) is connected with the anode of the automobile electronics; the other terminal of the resistor (36) is connected with a cathode of the voltage regulator tube (32) and one terminal of the resistor (37); the other terminal of the resistor (37) is grounded.

5. The regulating device of general automobile performance, as recited in claim 2, wherein the voltage recognition circuit comprises a capacitor (17); a triode (20); a voltage regulator tube (21); a photocoupler (23); a resistor (24); a resistor (27); a resistor (28); an LED (light emitting diode) (29); a triode (30); a capacitor (31); a voltage regulator tube (32); a diode (35); a resistor (36); and a resistor (37),
    wherein an anode of the capacitor (17) is connected with the two regulating circuits and an emitter of the triode (20); a cathode of the capacitor (17) is grounded; a pin (3) of photocoupler (23) is connected with a base of the triode (20); a pin (4) of photocoupler (23) is connected with a cathode of the voltage regulator tube (21) and one terminal of the resistor (24); an anode of the voltage regulator tube (21) is grounded; the other terminal of the resistor (24) is connected with a collector of the triode (20), one terminal of the resistor (27), one terminal of the resistor (28) and one terminal of the resistor (36); a pin (1) of the photocoupler (23) is connected with a cathode of the LED (29); a pin (2) of photocoupler (23) is connected with a collector of the triode (30); an emitter of the triode (30) is grounded; the other terminal of the resistor (28) is connected with an anode of the LED (29); a base of the triode (30) is connected with one terminal of the capacitor (31) and an anode of the voltage regulator tube (32); the other terminal of the capacitor (31) is grounded; the other terminal of the resistor (27) is connected with a cathode of the diode (35); an anode of the diode (35) is connected with the anode of the automobile electronics; the other terminal of the resistor (36) is connected with a cathode of the voltage regulator tube (32) and one terminal of the resistor (37); the other terminal of the resistor (37) is grounded.

6. The regulating device of general automobile performance, as recited in claim 1, wherein the other one of the two regulating circuits comprises:
an IC (4b), a resistor (11), a resistor (12), a capacitor (13), a capacitor (14), five of them constituting a second signal generating circuit;
a resistor (15), a resistor (16), a resistor (18), a triode (19), a resistor (22), five of them constituting a second dephasing circuit; and
a resistor (25), a field effect transistor (26), a diode (38), three of them constituting a second energy storing circuit,
wherein one terminal of the resistor (11) is connected with a pin (10) of the IC (4b), one terminal of the resistor (15) and the voltage recognition circuit; the other terminal of the resistor (11) is connected with a pin (13) of the IC (4b) and one terminal of the resistor (12); the other terminal of the resistor (12) is connected with a pin (8) and a pin (12) of the IC (4b), and with one terminal of the capacitor (13); the other terminal of the capacitor (13) is grounded; a pin (11) of the IC (4b) is connected with one terminal of the capacitor (14); the other terminal of the capacitor (14) is grounded; a pin (9) of the IC (4b) is connected with one terminal of the resistor (16); the other terminal of the resistor (16) is connected with one terminal of the resistor (18) and a base of the triode (19); the other terminal of the resistor (18) is grounded; the other terminal of the resistor (15) is connected with a collector of the triode (19), one terminal of the resistor (22) and the second energy storing circuit; an emitter of the triode (19) is grounded; the other terminal of the resistor (22) is grounded.

7. The regulating device of general automobile performance, as recited in claim 6, wherein the voltage recognition circuit comprises a capacitor (17); a triode (20); a voltage regulator tube (21); a photocoupler (23); a resistor (24); a resistor (27); a resistor (28); an LED (light emitting diode) (29); a triode (30); a capacitor (31); a voltage regulator tube (32); a diode (35); a resistor (36); and a resistor (37),
wherein an anode of the capacitor (17) is connected with the two regulating circuits and an emitter of the triode (20); a cathode of the capacitor (17) is grounded; a pin (3) of photocoupler (23) is connected with a base of the triode (20); a pin (4) of photocoupler (23) is connected with a cathode of the voltage regulator tube (21) and one terminal of the resistor (24); an anode of the voltage regulator tube (21) is grounded; the other terminal of the resistor (24) is connected with a collector of the triode (20), one terminal of the resistor (27), one terminal of the resistor (28) and one terminal of the resistor (36); a pin (1) of the photocoupler (23) is connected with a cathode of the LED (29); a pin (2) of photocoupler (23) is connected with a collector of the triode (30); an emitter of the triode (30) is grounded; the other terminal of the resistor (28) is connected with an anode of the LED (29); a base of the triode (30) is connected with one terminal of the capacitor (31) and an anode of the voltage regulator tube (32); the other terminal of the capacitor (31) is grounded; the other terminal of the resistor (27) is connected with a cathode of the diode (35); an anode of the diode (35) is connected with the anode of the automobile electronics; the other terminal of the resistor (36) is connected with a cathode of the voltage regulator tube (32) and one terminal of the resistor (37); the other terminal of the resistor (37) is grounded.

8. The regulating device of general automobile performance, as recited in claim 1, wherein the voltage recognition circuit comprises a capacitor (17); a triode (20); a voltage regulator tube (21); a photocoupler (23); a resistor (24); a resistor (27); a resistor (28); an LED (light emitting diode) (29); a triode (30); a capacitor (31); a voltage regulator tube (32); a diode (35); a resistor (36); and a resistor (37),
wherein an anode of the capacitor (17) is connected with the two regulating circuits and an emitter of the triode (20); a cathode of the capacitor (17) is grounded; a pin (3) of photocoupler (23) is connected with a base of the triode (20); a pin (4) of photocoupler (23) is connected with a cathode of the voltage regulator tube (21) and one terminal of the resistor (24); an anode of the voltage regulator tube (21) is grounded; the other terminal of the resistor (24) is connected with a collector of the triode (20), one terminal of the resistor (27), one terminal of the resistor (28) and one terminal of the resistor (36); a pin (1) of the photocoupler (23) is connected with a cathode of the LED (29); a pin (2) of photocoupler (23) is connected with a collector of the triode (30); an emitter of the triode (30) is grounded; the other terminal of the resistor (28) is connected with an anode of the LED (29); a base of the triode (30) is connected with one terminal of the capacitor (31) and an anode of the voltage regulator tube (32); the other terminal of the capacitor (31) is grounded; the other terminal of the resistor (27) is connected with a cathode of the diode (35); an anode of the diode (35) is connected with the anode of the automobile electronics; the other terminal of the resistor (36) is connected with a cathode of the voltage regulator tube (32) and one terminal of the resistor (37); the other terminal of the resistor (37) is grounded.

9. A regulating device of general automobile performance connected with automobile electronics, comprising:
an electrical source with its anode and cathode respectively connected with an anode and a cathode of the automobile electronics;
at least two regulating circuits connected with each other in parallel, wherein output signals of the two regulating circuits are outputted to the automobile electronics; and
a voltage recognition circuit for supplying power to and controlling on/off state of two paths of the two regulating circuits, wherein the voltage recognition circuit comprises:
a plurality of voltage division resistors connected with an anode of the automobile electronics for obtaining a divided voltage;
a voltage regulator tube connected with the voltage division resistors for obtaining a stable voltage when a reverse breakdown of the voltage regulator tube occurs;
a plurality of optical coupling components for supplying an electrically-isolated power to the two regulating circuits;
a first triode connected with an output of the voltage regulator tube for conducting or blocking the optical coupling components; and
a second triode connected with an output of the optical coupling components for finally outputting the electrically-isolated power to the entire regulating device.

10. The regulating device of general automobile performance, as recited in claim 9, wherein the voltage recognition circuit comprises a capacitor (17); a triode (20); a voltage regulator tube (21); a photocoupler (23); a resistor (24); a resistor (27); a resistor (28); an LED (light emitting diode) (29); a triode (30); a capacitor (31); a voltage regulator tube (32); a diode (35); a resistor (36); and a resistor (37),
wherein an anode of the capacitor (17) is connected with the two regulating circuits and an emitter of the triode (20); a cathode of the capacitor (17) is grounded; a pin (3) of photocoupler (23) is connected with a base of the triode (20); a pin (4) of photocoupler (23) is connected with a cathode of the voltage regulator tube (21) and one terminal of the resistor (24); an anode of the voltage regulator tube (21) is grounded; the other terminal of the resistor (24) is connected with a collector of the triode (20), one terminal of the resistor (27), one terminal of the resistor (28) and one terminal of the resistor (36); a pin (1) of the photocoupler (23) is connected with a cathode of the LED (29); a pin (2) of photocoupler (23) is connected with a collector of the triode (30); an emitter of the triode (30) is grounded; the other terminal of the resistor (28) is connected with an anode of the LED (29); a base of the triode (30) is connected with one terminal of the capacitor (31) and an anode of the voltage regulator tube (32); the other terminal of the capacitor (31) is grounded; the other terminal of the resistor (27) is connected with a cathode of the diode (35); an anode of the diode (35) is connected with the anode of the automobile electronics; the other terminal of the resistor (36) is connected with a cathode of the voltage regulator tube (32) and one terminal of the resistor (37); the other terminal of the resistor (37) is grounded.

11. The regulating device of general automobile performance, as recited in claim 10, wherein each of the two regulating circuits comprises a signal generating circuit, a dephasing circuit and an energy storing circuit; the signal generating circuit is a 556 IC with a peripheral RC time circuit; the dephasing circuit is a triode with peripheral resistors for limiting an amplitude of and dephasing a square signal; the energy storing circuit comprises a field effect transistor, an inductor and a diode which are connected with each other.

12. The regulating device of general automobile performance, as recited in claim 11, wherein one of the two regulating circuits comprises:
a resistor (1), a resistor (2), a capacitor (3), an IC (4a), a capacitor (5), five of them constituting a first signal generating circuit;
a resistor (6), a resistor (7), a resistor (8), a triode (9), a resistor (10), five of them constituting a first dephasing circuit; and
an inductor (33), a field effect transistor (34), a diode (39), three of them constituting a first energy storing circuit,
wherein a pin (1) of the IC (4a) is connected with one terminal of the resistor (1) and one terminal of the resistor (2); the other terminal of the resistor (2) is connected with a pin (6) and a pin (2) of the IC (4a), as well as with one terminal of the capacitor (3); the other terminal of the capacitor (3) is grounded; the other terminal of the resistor (1) is connected with a pin (14) and a pin (4) of the IC (4a), with one terminal of the resistor (8) and with the other regulating circuit of the two regulating circuits; a pin (3) of the IC (4a) is connected with one terminal of the capacitor (5); the other terminal of the capacitor (5) is grounded; a pin (7) of the IC (4a) is grounded; a pin (5) of the IC (4a) is connected with one terminal of the resistor (6); the other terminal of the resistor (6) is connected with one terminal of the resistor (7) and a base of the triode (9); the other terminal of the resistor (7) is grounded; the other terminal of the resistor (8) is connected with a collector of the triode (9), one terminal of the resistor (10) and the first energy storing circuit; an emitter of the triode (9) is grounded; the other terminal of the resistor (10) is grounded.

13. The regulating device of general automobile performance, as recited in claim 10, wherein the other one of the two regulating circuits comprises:
an IC (4b), a resistor (11), a resistor (12), a capacitor (13), a capacitor (14), five of them constituting a second signal generating circuit;
a resistor (15), a resistor (16), a resistor (18), a triode (19), a resistor (22), five of them constituting a second dephasing circuit; and
a resistor (25), a field effect transistor (26), a diode (38), three of them constituting a second energy storing circuit,
wherein one terminal of the resistor (11) is connected with a pin (10) of the IC (4b), one terminal of the resistor (15) and the voltage recognition circuit; the other terminal of the resistor (11) is connected with a pin (13) of the IC (4b) and one terminal of the resistor (12); the other terminal of the resistor (12) is connected with a pin (8) and a pin (12) of the IC (4b), and with one terminal of the capacitor (13); the other terminal of the capacitor (13) is grounded; a pin (11) of the IC (4b) is connected with one terminal of the capacitor (14); the other terminal of the capacitor (14) is grounded; a pin (9) of the IC (4b) is connected with one terminal of the resistor (16); the other terminal of the resistor (16) is connected with one terminal of the resistor (18) and a base of the triode (19); the other terminal of the resistor (18) is grounded; the other terminal of the resistor (15) is connected with a collector of the triode (19), one terminal of the resistor (22) and the second energy storing circuit; an emitter of the triode (19) is grounded; the other terminal of the resistor (22) is grounded.

14. The regulating device of general automobile performance, as recited in claim 10, wherein one of the two regulating circuits comprises:
a resistor (1), a resistor (2), a capacitor (3), an IC (4a), a capacitor (5), five of them constituting a first signal generating circuit;
a resistor (6), a resistor (7), a resistor (8), a triode (9), a resistor (10), five of them constituting a first dephasing circuit; and
an inductor (33), a field effect transistor (34), a diode (39), three of them constituting a first energy storing circuit, wherein a pin (1) of the IC (4a) is connected with one terminal of the resistor (1) and one terminal of the resistor (2); the other terminal of the resistor (2) is connected with a pin (6) and a pin (2) of the IC (4a), as well as with one terminal of the capacitor (3); the other terminal of the capacitor (3) is grounded; the other terminal of the resistor (1) is connected with a pin (14) and a pin (4) of the IC (4a), with one terminal of the resistor (8) and with the other regulating circuit of the two regulating circuits; a pin (3) of the IC (4a) is connected with one terminal of the capacitor (5); the other terminal of the capacitor (5) is grounded; a pin (7) of the IC (4a) is grounded; a pin (5) of the IC (4a) is connected with one terminal of the resistor (6); the other terminal of the resistor (6) is connected with one terminal of the resistor (7) and a base of the triode (9); the other terminal of the resistor (7) is grounded; the other terminal of the resistor (8) is connected with a collector of the triode (9), one terminal of the resistor (10) and the first energy storing circuit; an emitter of the triode (9) is grounded; the other terminal of the resistor (10) is grounded.

15. The regulating device of general automobile performance, as recited in claim 11, wherein the other one of the two regulating circuits comprises:
    an IC (4b), a resistor (11), a resistor (12), a capacitor (13), a capacitor (14), five of them constituting a second signal generating circuit;
    a resistor (15), a resistor (16), a resistor (18), a triode (19), a resistor (22), five of them constituting a second dephasing circuit; and
    a resistor (25), a field effect transistor (26), a diode (38), three of them constituting a second energy storing circuit,
    wherein one terminal of the resistor (11) is connected with a pin (10) of the IC (4b), one terminal of the resistor (15) and the voltage recognition circuit; the other terminal of the resistor (11) is connected with a pin (13) of the IC (4b) and one terminal of the resistor (12); the other terminal of the resistor (12) is connected with a pin (8) and a pin (12) of the IC (4b), and with one terminal of the capacitor (13); the other terminal of the capacitor (13) is grounded; a pin (11) of the IC (4b) is connected with one terminal of the capacitor (14); the other terminal of the capacitor (14) is grounded; a pin (9) of the IC (4b) is connected with one terminal of the resistor (16); the other terminal of the resistor (16) is connected with one terminal of the resistor (18) and a base of the triode (19); the other terminal of the resistor (18) is grounded; the other terminal of the resistor (15) is connected with a collector of the triode (19), one terminal of the resistor (22) and the second energy storing circuit; an emitter of the triode (19) is grounded; the other terminal of the resistor (22) is grounded.

16. The regulating device of general automobile performance, as recited in claim 9, wherein each of the two regulating circuits comprises a signal generating circuit, a dephasing circuit and an energy storing circuit; the signal generating circuit is a 556 IC with a peripheral RC time circuit; the dephasing circuit is a triode with peripheral resistors for limiting an amplitude of and dephasing a square signal; the energy storing circuit comprises a field effect transistor, an inductor and a diode which are connected with each other.

17. The regulating device of general automobile performance, as recited in claim 16, wherein one of the two regulating circuits comprises:
    a resistor (1), a resistor (2), a capacitor (3), an IC (4a), a capacitor (5), five of them constituting a first signal generating circuit;
    a resistor (6), a resistor (7), a resistor (8), a triode (9), a resistor (10), five of them constituting a first dephasing circuit; and
    an inductor (33), a field effect transistor (34), a diode (39), three of them constituting a first energy storing circuit,
    wherein a pin (1) of the IC (4a) is connected with one terminal of the resistor (1) and one terminal of the resistor (2); the other terminal of the resistor (2) is connected with a pin (6) and a pin (2) of the IC (4a), as well as with one terminal of the capacitor (3); the other terminal of the capacitor (3) is grounded; the other terminal of the resistor (1) is connected with a pin (14) and a pin (4) of the IC (4a), with one terminal of the resistor (8) and with the other regulating circuit of the two regulating circuits; a pin (3) of the IC (4a) is connected with one terminal of the capacitor (5); the other terminal of the capacitor (5) is grounded; a pin (7) of the IC (4a) is grounded; a pin (5) of the IC (4a) is connected with one terminal of the resistor (6); the other terminal of the resistor (6) is connected with one terminal of the resistor (7) and a base of the triode (9); the other terminal of the resistor (7) is grounded; the other terminal of the resistor (8) is connected with a collector of the triode (9), one terminal of the resistor (10) and the first energy storing circuit; an emitter of the triode (9) is grounded; the other terminal of the resistor (10) is grounded.

18. The regulating device of general automobile performance, as recited in claim 16, wherein the other one of the two regulating circuits comprises:
    an IC (4b), a resistor (11), a resistor (12), a capacitor (13), a capacitor (14), five of them constituting a second signal generating circuit;
    a resistor (15), a resistor (16), a resistor (18), a triode (19), a resistor (22), five of them constituting a second dephasing circuit; and
    a resistor (25), a field effect transistor (26), a diode (38), three of them constituting a second energy storing circuit,
    wherein one terminal of the resistor (11) is connected with a pin (10) of the IC (4b), one terminal of the resistor (15) and the voltage recognition circuit; the other terminal of the resistor (11) is connected with a pin (13) of the IC (4b) and one terminal of the resistor (12); the other terminal of the resistor (12) is connected with a pin (8) and a pin (12) of the IC (4b), and with one terminal of the capacitor (13); the other terminal of the capacitor (13) is grounded; a pin (11) of the IC (4b) is connected with one terminal of the capacitor (14); the other terminal of the capacitor (14) is grounded; a pin (9) of the IC (4b) is connected with one terminal of the resistor (16); the other terminal of the resistor (16) is connected with one terminal of the resistor (18) and a base of the triode (19); the other terminal of the resistor (18) is grounded; the other terminal of the resistor (15) is connected with a collector of the triode (19), one terminal of the resistor (22) and the second energy storing circuit; an emitter of the triode (19) is grounded; the other terminal of the resistor (22) is grounded.

19. The regulating device of general automobile performance, as recited in claim 9, wherein one of the two regulating circuits comprises:
    a resistor (1), a resistor (2), a capacitor (3), an IC (4a), a capacitor (5), five of them constituting a first signal generating circuit;

a resistor (6), a resistor (7), a resistor (8), a triode (9), a resistor (10), five of them constituting a first dephasing circuit; and an inductor (33), a field effect transistor (34), a diode (39), three of them constituting a first energy storing circuit, wherein a pin (1) of the IC (4a) is connected with one terminal of the resistor (1) and one terminal of the resistor (2); the other terminal of the resistor (2) is connected with a pin (6) and a pin (2) of the IC (4a), as well as with one terminal of the capacitor (3); the other terminal of the capacitor (3) is grounded; the other terminal of the resistor (1) is connected with a pin (14) and a pin (4) of the IC (4a), with one terminal of the resistor (8) and with the other regulating circuit of the two regulating circuits; a pin (3) of the IC (4a) is connected with one terminal of the capacitor (5); the other terminal of the capacitor (5) is grounded; a pin (7) of the IC (4a) is grounded; a pin (5) of the IC (4a) is connected with one terminal of the resistor (6); the other terminal of the resistor (6) is connected with one terminal of the resistor (7) and a base of the triode (9); the other terminal of the resistor (7) is grounded; the other terminal of the resistor (8) is connected with a collector of the triode (9), one terminal of the resistor (10) and the first energy storing circuit; an emitter of the triode (9) is grounded; the other terminal of the resistor (10) is grounded.

20. The regulating device of general automobile performance, as recited in claim 9, wherein the other one of the two regulating circuits comprises:

an IC (4b), a resistor (11), a resistor (12), a capacitor (13), a capacitor (14), five of them constituting a second signal generating circuit;

a resistor (15), a resistor (16), a resistor (18), a triode (19), a resistor (22), five of them constituting a second dephasing circuit; and a resistor (25), a field effect transistor (26), a diode (38), three of them constituting a second energy storing circuit, wherein one terminal of the resistor (11) is connected with a pin (10) of the IC (4b), one terminal of the resistor (15) and the voltage recognition circuit; the other terminal of the resistor (11) is connected with a pin (13) of the IC (4b) and one terminal of the resistor (12); the other terminal of the resistor (12) is connected with a pin (8) and a pin (12) of the IC (4b), and with one terminal of the capacitor (13); the other terminal of the capacitor (13) is grounded; a pin (11) of the IC (4b) is connected with one terminal of the capacitor (14); the other terminal of the capacitor (14) is grounded; a pin (9) of the IC (4b) is connected with one terminal of the resistor (16); the other terminal of the resistor (16) is connected with one terminal of the resistor (18) and a base of the triode (19); the other terminal of the resistor (18) is grounded; the other terminal of the resistor (15) is connected with a collector of the triode (19), one terminal of the resistor (22) and the second energy storing circuit; an emitter of the triode (19) is grounded; the other terminal of the resistor (22) is grounded.

\* \* \* \* \*